US007994896B2

(12) United States Patent
Fitzgibbon

(10) Patent No.: US 7,994,896 B2
(45) Date of Patent: Aug. 9, 2011

(54) SYSTEM AND METHOD FOR OPERATING A MOVEABLE BARRIER USING A LOOP DETECTOR

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 144 days.

(21) Appl. No.: 10/976,605

(22) Filed: Oct. 29, 2004

(65) Prior Publication Data

US 2006/0091998 A1 May 4, 2006

(51) Int. Cl.
*B60R 25/00* (2006.01)

(52) U.S. Cl. ...................... 340/5.71; 340/5.22; 340/5.61

(58) Field of Classification Search ................. 340/5.71, 340/10.41, 5.1, 5.2, 5.7, 10.1, 5.6, 5.64, 5.22, 340/5.61, 825.69; 455/352; 49/18; 343/788
See application file for complete search history.

(56) References Cited

U.S. PATENT DOCUMENTS

| | | | | | |
|---|---|---|---|---|---|
| 5,414,624 | A | * | 5/1995 | Anthonyson | 235/384 |
| 5,621,412 | A | * | 4/1997 | Sharpe et al. | 340/10.33 |
| 5,686,903 | A | * | 11/1997 | Duckworth et al. | 340/825.22 |
| 5,940,007 | A | * | 8/1999 | Brinkmeyer et al. | 340/5.72 |
| 6,002,332 | A | * | 12/1999 | King | 340/545.1 |
| 6,427,913 | B1 | * | 8/2002 | Maloney | 235/385 |
| 6,535,143 | B1 | * | 3/2003 | Miyamoto et al. | 340/5.42 |
| 7,289,014 | B2 | * | 10/2007 | Mullet et al. | 340/5.7 |
| 2003/0112119 | A1 | * | 6/2003 | Hom et al. | 340/5.2 |

* cited by examiner

*Primary Examiner* — Vernal U Brown
(74) *Attorney, Agent, or Firm* — Fitch, Even, Tabin & Flannery

(57) ABSTRACT

A moveable barrier system includes a loop detector for providing an electrical field. The electrical field has an associated base frequency. The base frequency changes when a vehicle enters the loop detector and the loop detector detects this change. A transmitter device is positioned at the vehicle. The transmitter detects the base frequency of the electrical field as the vehicle becomes positioned in proximity to the loop detector. The transmitter responsively transmits a coded signal to a moveable barrier operator when the base frequency is detected. The coded signal is operable to actuate the moveable barrier operator.

18 Claims, 4 Drawing Sheets

SYSTEM AND METHOD FOR OPERATING A MOVEABLE BARRIER USING A LOOP DETECTOR

FIELD OF THE INVENTION

The field of the invention generally relates to methods and devices for controlling moveable barriers. More specifically, it relates to actuating moveable barriers having loop detector arrangements.

BACKGROUND OF THE INVENTION

Loop detector systems detect the change in inductance of a wire loop that is placed in the ground that occurs when a vehicle or other large object enters that loop. The wire loop is often driven by an AC electric current which is provided at or near base a frequency set by an oscillator.

Loop detectors have been used in a variety of circumstances. For instance, loop detectors have been used at traffic lights to indicate that a vehicle is present so that the traffic light can be changed and the vehicle can proceed through an intersection. In another example, loop detectors have been placed in front of a barrier such as a gate. When a vehicle enters the loop, the detector indicates the presence of the vehicle to a moveable barrier operator, which moves the gate so the vehicle can pass. Similarly, the gate is held open until the vehicle has left the pathway of the gate. The above-mentioned systems suffered from the disadvantage that the identity of the vehicle or occupant was never determined.

To identify the occupant, other systems used RF identification tags to identify a vehicle when the vehicle was in the vicinity of the barrier to be opened. In these systems, the RF Identification tags had information stored on them. An antenna near the barrier directed a signal at the tags to read the information. In this way, the identity of a user (written into the tags) was retrieved at the entrance of a barrier. Once the RF ID was retrieved and matched with the IDs of users who could proceed through the barrier, the barrier was opened. Similarly, other previous barrier control systems detected an RF transmission manually generated by a user at a transmitter.

However, even though these systems automatically opened barriers and considered the identity of the user in making determinations to open a barrier, these previous systems also suffered from certain shortcomings. For example, the cost of special antennas and processing circuitry for reading the RFID can be high and beyond the reach of many private users. In addition, in many environments, radio interference is a problem, making sensing the RF tags difficult or leading to errors in processing the information. Also, the sending of the user generated code does not provide a sufficiently automatic operation.

SUMMARY OF THE INVENTION

A system for operating a moveable barrier uses the detection of information indicating a loop detector exists. A transmitter, positioned at a vehicle, senses the existence of the loop of a loop detector system, for instance, by sensing the base frequency of the electrical signal transmitted by the loop. The transmitter can then actuate a moveable barrier based upon the detection of the loop.

In many of these embodiments, a moveable barrier system includes a loop detector, which provides an electrical field. The electrical field has an associated base frequency. The base frequency changes once a vehicle enters the loop and the loop detector detects this change in base frequency. A transmitter device is positioned at the vehicle. The transmitter detects the base frequency of the electrical field as the vehicle becomes positioned in the proximity of the loop detector. The transmitter responsively transmits a coded signal to a moveable barrier operator when the base frequency is detected. The coded signal is operable to actuate the moveable barrier operator.

The coded signal may be modulated by a number of techniques. For example, it may be amplitude modulated, frequency modulated, or spread spectrum modulated. The transmitter may also send an initial query and receive a response before sending the coded signal.

Thus, a system and method are provided that allow a barrier to be opened automatically and after identification of a user has been made. The system is easy and cost-effective to implement and does not require the purchase of complex and/or costly components.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION OF THE PREFERRED EMBODIMENTS

Figure 1:
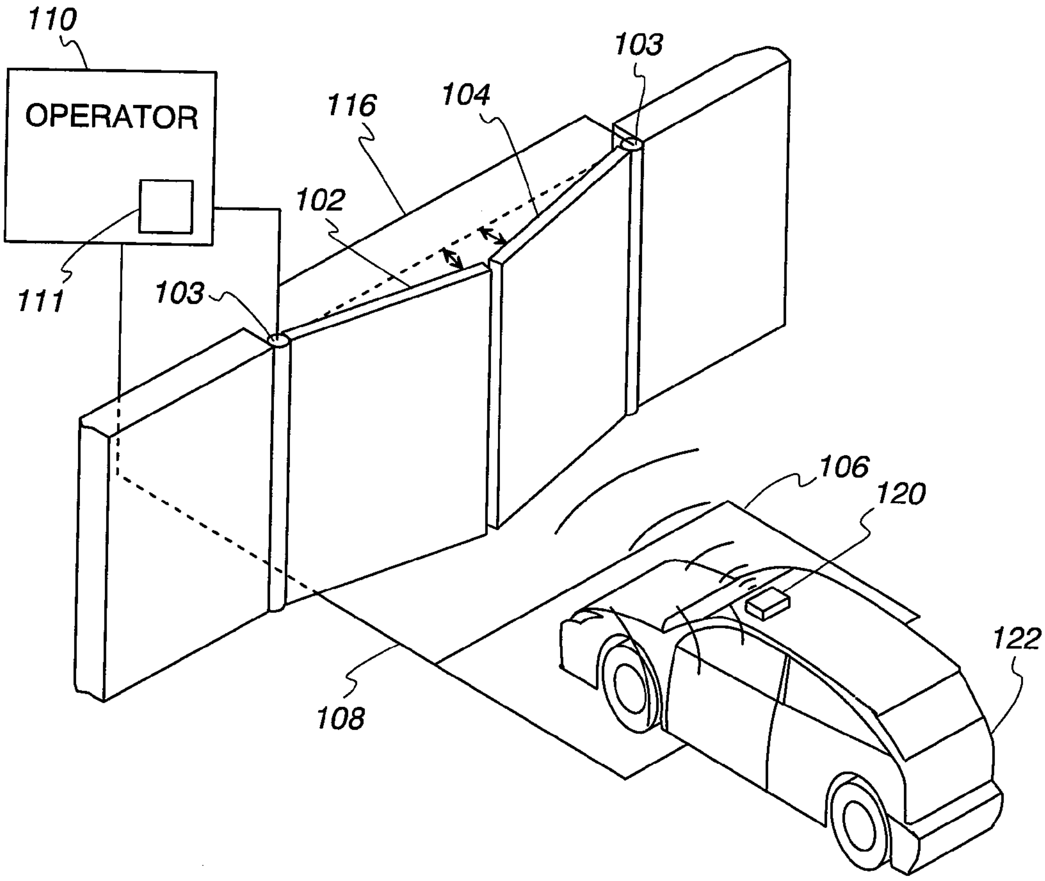
FIG. 1 is a block diagram of a system for actuating a movable barrier according to the present invention.

Referring now to the drawings and especially FIG. 1, a system using a loop detector to actuate a moveable barrier is described. A loop 106 is placed in the ground. The loop 106 is coupled to an operator 110 via a cable 108. The cable provides a path for sensing electrical signals representing the inductance of the loop 106.

For illustrative purposes, the description with respect to FIG. 1 refers to a moveable barrier that is a gate. However, it will be understood by those skilled in the art that the moveable barrier may not only be a gate, but may be any type of barrier such as a fire door, shutter, window, or garage door. Other examples of barriers are possible.

The operator 110 provides functionality for driving the loop detector 106 with an oscillator 111. For convenience in viewing, the operator 110 is shown placed above a wall in FIG. 1. However, it will be understood that the operator 110 may be positioned in any convenient and/or secure place, for example, behind the wall, in a building, or in the ground. The oscillator 111 may drive the loop 106 with an electrical signal having a frequency.

When a vehicle 122 enters the loop 106, the frequency of the loop 106 changes. This change in frequency is sensed by the operator 110 via wire 108. The operator 110 compares frequency change to a threshold stored at the operator 110. Alternatively, the operator 110 may supply a signal with a center frequency. Deviations from the center frequency are measured by the operator 110 and if the deviation exceeds a threshold, then a vehicle 122 has entered the loop 106. Other detection methods are possible.

In known systems, the controller uses the vehicle presence/absence information to control the movement of the gate. For example, once a vehicle is detected the gate may not be closed until the vehicle is no longer present.

The operator 110 is coupled to gates 102 and 104 via a wire 116. The operator 110 determines when to open or close the gates 102 and 104.

The operator 110 may also include additional apparatus to provide gate security. For example, the operator 110 may include circuitry to receive coded signals from a transmitter 120. The transmitter 120 may be carried in the vehicle 122, or attached outside the vehicle 122. When the transmitter 120 detects the loop 106, then it informs the operator 110 and the operator 110 may open the gates 102 and 104 allowing the vehicle 122 to enter. The operator 110 may automatically close the gates 102 and 104 when it is determined that the vehicle 122 has passed through the loop 106 and it is safe to close the gates 102 and 104. In still another example, the operator 110 may open and close the gates 102 and 104 whenever a button on the transmitter is pressed and the detection of the loop 106 is made.

A detector in the transmitter 120 has an appropriate range to detect all variations in oscillator frequency. For example, for an oscillator with a 10 khz output, the detector may detect all frequencies in the 9 to 11 Khz range.

In one example of the operation of the system of FIG. 1, the transmitter 120 is positioned within the vehicle 122. The transmitter 120 is equipped with circuitry to detect the frequency at which the loop is being operated. The transmitter 120 detects the base frequency of the electrical field of the loop detector 106 as the vehicle becomes positioned in proximity to the loop 106 or enters the loop 106. The transmitter 120 then responsively transmits a coded signal to the moveable barrier operator 110 when the base frequency is detected. The coded signal is operable to actuate the operator 110 and motors 103 which open the gates 102 and 104. The operation of barrier movement controllers in response coded, wireless signals is well known in the art.

The base frequency may be a modulated signal. For example, the signal may be modulated according to amplitude modulation (AM), frequency modulation (FM), and spread spectrum (SS) modulation techniques. This modulation may include coded information that may be also used by the transmitter to identify the loop. For example, the modulated information may include the identity of the barrier controller including the loop 106 producing the signal. When the transmitter determines that it is at an appropriate barrier movement system, a code to enable the barrier movement system is transmitted.

Figure 2:
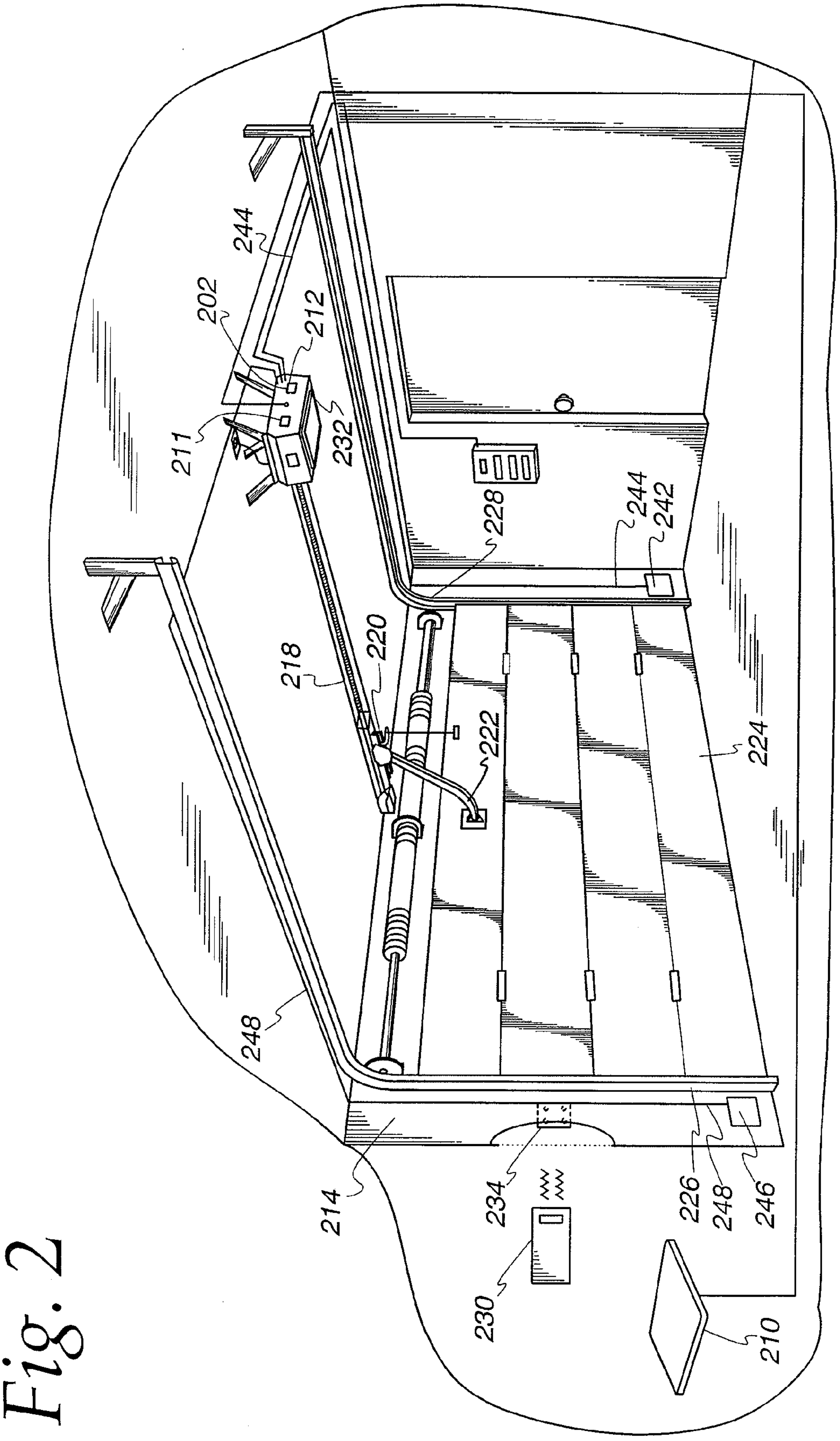
FIG. 2 is a block diagram of a system for actuating a movable barrier according to the present invention.

Referring now to FIG. 2, a movable barrier operator, which is a garage door operator, is generally shown therein and includes a head unit 212 mounted within a garage 214. The head unit 212 is mounted to the ceiling of the garage 214 and includes a rail 218 extending there from with a releasable trolley 220 attached having an arm 222 extending to a multiple paneled garage door 224 positioned for movement along a pair of door rails 226 and 228.

The following description with respect to FIG. 2 refers to a moveable barrier that is a garage door. However, it will be understood by those skilled in the art that the moveable barrier may not only be a garage door but may be any type of barrier such as a fire door, shutter, window, gate. Other examples of barriers are possible.

More specifically, The system includes a hand-held transmitter unit 230 adapted to send signals to an antenna 232 positioned on the head unit 212 as will appear hereinafter. An external control pad 234 is positioned on the outside of the garage having a plurality of buttons thereon and communicates via radio frequency transmission with the antenna 232 of the head unit 212. An optical emitter 242 is connected via a power and signal line 244 to the head unit. An optical detector 246 is connected via a wire 248 to the head unit 212. The head unit 212 also includes a receiver unit 202. The receiver unit 202 receives a wireless signal, which is used to actuate the garage door opener. The transmitter 230 may be placed in a vehicle.

An oscillator 211 is positioned in the head unit 212 and is connected to the loop 210, which is placed in the ground. The oscillator energizes the loop 210 and drives the loop 210 at a frequency. When the car approaches the loop the transmitter 230 senses this frequency and sends a coded signal to the head unit 212 to actuate the garage door 224.

The loop 210 is placed in the ground. The loop 210 is a conductive wire that is energized and driven at a base frequency by the oscillator 211. When a vehicle enters the loop 210, the transmitter 230 detects the frequency and then sends a coded signal to the head unit 212 indicating that the door 220 should be opened or closed.

Figure 3:
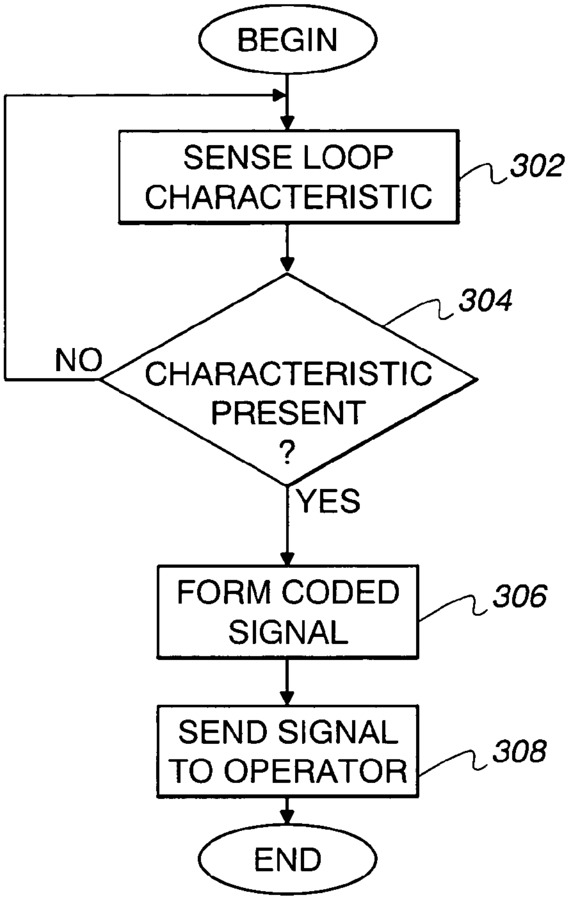
FIG. 3 is a flowchart of an approach for actuating a movable barrier according to the present invention.

Referring now to FIG. 3, one example of an approach for actuating a moveable barrier operator by using the detection of a loop detector is described. At step 302, a characteristic of a loop is sensed. For example, the base frequency of operation of the loop of a loop detector circuit may be sensed by a transmitter. The transmitter may be positioned within a vehicle or outside a vehicle.

At step 304, it is determined whether the defining characteristic has been sensed. If the answer is negative, then control returns to step 302 where execution continues as has been described above. If the answer at step 304 is affirmative, then at step 306 a coded signal is formed at the transmitter. The coded signal, once received at a moveable barrier operator, will actuate the moveable barrier. At step 308 the signal is transmitted to the moveable barrier operator. Execution then ends.

Figure 4:
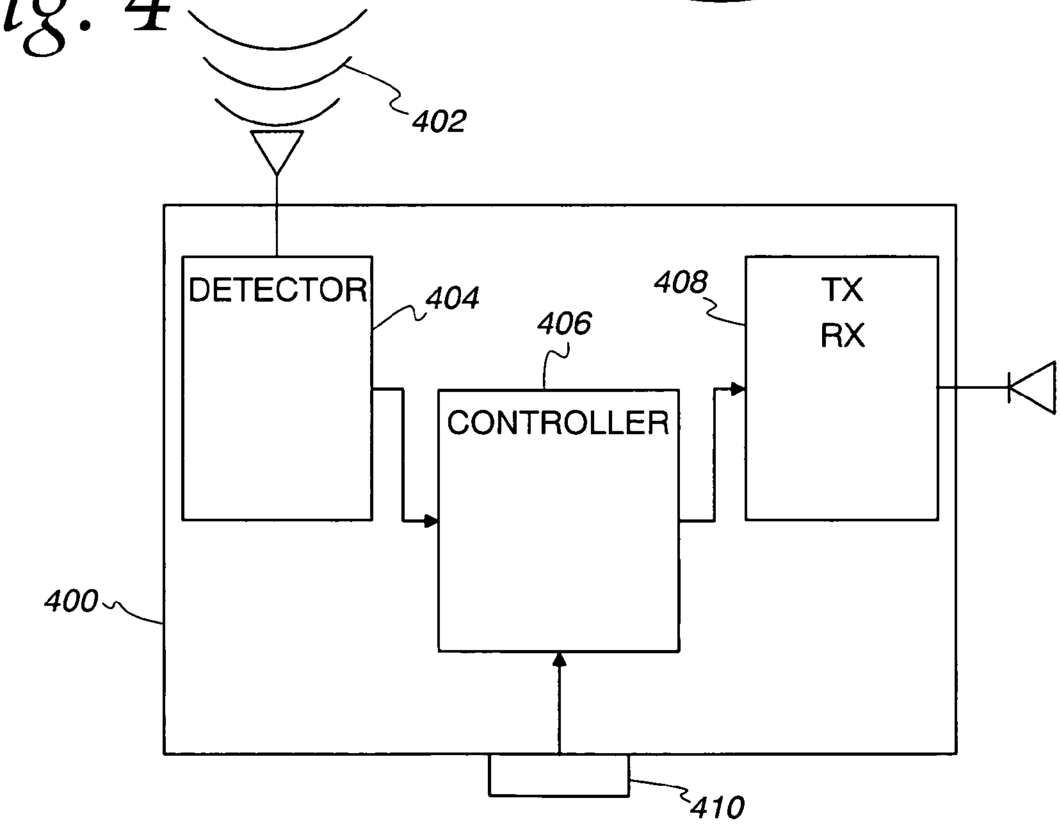
FIG. 4 is a block diagram of a transmitter for detecting the presence of a loop detector according to the present invention.

Referring now to FIG. 4, one example of a transmitter 400 is described. The transmitter 400 may be carried inside a vehicle. Alternatively, the transmitter 400 may be placed outside the vehicle.

A detector 404 is used to detect characteristic information 402 concerning the loop detector. For example, this information could be frequency information if the loop detector wire emits a signal having a particular frequency. The detector 404 may also detect the strength of the field or some other characteristic that identifies the field or signal that is produced by the loop.

A button 410 may be used by an operator to alternatively activate the transmitter 400. For example, a user may press the button 410 and a coded signal may be formed by the controller 406. The code signal may be forwarded to a transmitter/receiver circuit 408. The transmitter/receiver circuit 408 transmits the coded signal to the moveable barrier operator.

Alternatively, the detector 404 may detect the characteristic information and forwards it to the controller 406. The controller 406 determines if the information is reliable enough to make a determination that a loop is present. For example, the controller 406 may determine if the information actually matches the frequency of the loop circuit if the detector is searching for a frequency. The detector 404 may also provide a signal with a certain strength and the controller 406 may ensure that the signal is of sufficient strength to support the conclusion that the signal is from the correct loop detector and is not noise or some other false signal or reading.

Figure 5:
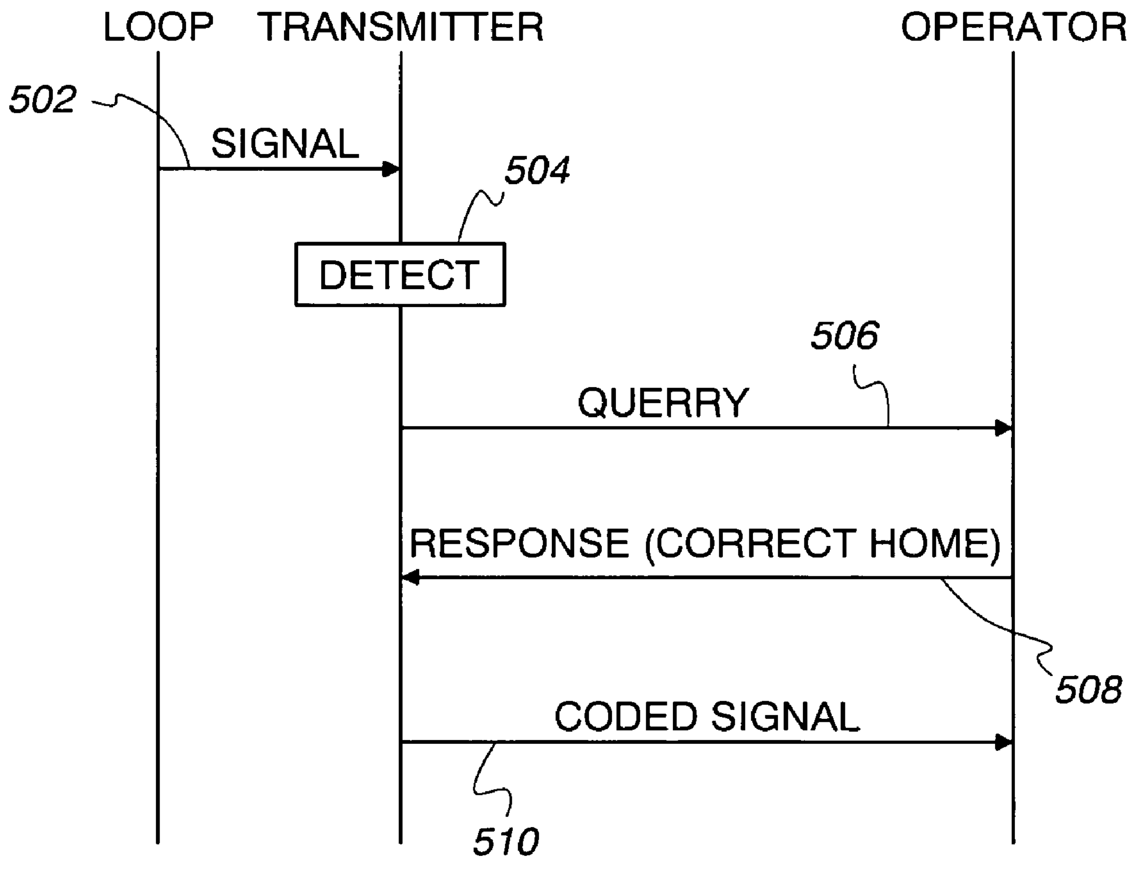
FIG. 5 is a flow chart of an approach for detecting the presence of a loop detector and actuating a moveable barrier operator according to the present invention.

Referring now to FIG. 5, another example of an approach for activating a moveable barrier operator upon the detection of a loop detector is described. At step 502, a signal is received at the transmitter from the loop detector. The signal may be an electromagnetic signal produced by the loop detector and have a certain frequency. At step 504, the transmitter may determine if the detected signal matched the predetermined frequency. If this is the case, then at step 506 the transmitter sends a query signal to the moveable barrier operator. The purpose of the query signal is to inquire at the moveable barrier operator if the moveable barrier operator is the "home" of the transmitter. In other words, the purpose is to determine if the transmitter is the particular transmitter that activates the moveable barrier operator.

At step 508, a response is sent from the moveable barrier operator to the transmitter. The response indicates that the moveable barrier operator is the correct home for the transmitter. Alternatively, if the moveable barrier operator were not the correct home for the transmitter, the response sent at step 508 would indicate this information to the transmitter.

At step 510, the transmitter sends a coded signal to the moveable barrier operator. The coded signal is used to actuate the moveable barrier operator.

Thus, these embodiments provide approaches that allow a barrier to be opened automatically and after identification of a user has been made. The approaches described are cost-effective and simple to implement and also do not require the purchase of complex and/or costly components.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A moveable barrier system comprising:

a loop detector that is adapted and configured to generate an electrical field, the electrical field having an associated base frequency, the base frequency being changed by presence of a vehicle and the loop detector configured to detect the change in the base frequency; and a transmitter device positioned at the vehicle, the transmitter configured to detect the base frequency of the electrical field as the vehicle becomes positioned in proximity to the loop detector and, in response to detecting the base frequency, to wirelessly transmit a coded signal directly to an antenna of a moveable barrier operator, the moveable barrier operator configured to actuate a barrier in response to receiving the coded signal at the antenna directly from the transmitter.

2. The moveable barrier system of claim 1 wherein the electrical field is selected from a group comprising an amplitude modulated signal, a frequency modulated signal, and a spread spectrum modulation signal.

3. The moveable barrier system of claim 1 wherein the coded signal is a query.

4. The moveable barrier system of claim 3 wherein the transmitter device waits to receive a response after the query is transmitted to the moveable barrier operator and responsively transmits a second coded signal to the moveable barrier operator upon detecting the response.

5. The moveable barrier system of claim 1 wherein the transmitter device is mounted on the vehicle.

6. The moveable barrier system of claim 1 wherein the transmitter device is positioned within the vehicle.

7. A system for operating a moveable barrier, the system comprising:

a loop detector that is adapted and configured to generate an electrical field having a base frequency, the base frequency of the loop detector being changed when a vehicle enters the proximity of the loop detector, the loop detector configured to transmit a signal to a moveable barrier entry system to indicate when the frequency has changed and a vehicle is present in proximity to the loop detector and the moveable barrier; and a transmitter configured to be positioned within a motor vehicle and communicatively coupled to the loop detector and to detect the base frequency of the electrical field of the loop detector and to responsively transmit an actuation message directly to an antenna in communication with a controller in the moveable barrier entry system in response to detecting the base frequency of the electrical field, the controller being configured to actuate the moveable barrier in response to receiving the actuation message.

8. The system of claim 7 wherein the electrical field is modulated.

9. The system of claim 8 wherein the electrical field is modulated by a technique selected from a group of techniques comprising amplitude modulation (AM), frequency modulation (FM) and spread spectrum (SS) modulation.

10. The system of claim 7 wherein the electrical field comprises a coded signal.

11. The system of claim 7 wherein the actuation message comprises a query.

12. A method of operating a transmitter positioned in a vehicle, the method comprising:

producing an electric field having a base frequency at a loop detector;

changing the base frequency of the electric field by moving a vehicle in proximity of the loop detector;

detecting the base frequency of the electrical field at a transmitter;

in response to detecting the base frequency of the electrical field, directly and wirelessly sending a signal from the transmitter to an antenna of a movable barrier operator; and performing an action at the operator to actuate the movable barrier operator in response to the movable barrier operator's antenna receiving the signal directly from the transmitter.

13. The method of claim 12 wherein detecting the change comprises detecting a change in a base frequency of the loop detector.

14. The method of claim 12 wherein the detecting comprises detecting a modulated signal.

15. The method of claim 14 wherein the detecting comprises detecting a modulated signal selected from a group comprising an amplitude modulated (AM) signal, a frequency modulated (FM) signal and a spread spectrum (SS) modulated signal.

16. The method of claim 14 wherein the detecting comprises detecting a signal encrypted according to a predetermined fixed or variable code.

17. The method of claim 14 wherein the sending the signal comprises sending a query to the barrier operator.

18. The method of claim 17 further comprising, in response to the query, receiving a response message from the barrier operator at the transmitter.

* * * * *